United States Patent [19]

Rhoads

[11] Patent Number: 5,187,926
[45] Date of Patent: Feb. 23, 1993

[54] GRASS LINE MOWING APPARATUS

[76] Inventor: James F. Rhoads, 1525 Judson Dr., Boulder, Colo. 80303

[21] Appl. No.: 760,732

[22] Filed: Sep. 16, 1991

[51] Int. Cl.[5] ...................... A01D 34/67; A01D 34/74
[52] U.S. Cl. ..................................... 56/16.7; 56/17.2; 56/255
[58] Field of Search ...................... 56/16.7, 17.2, 17.5, 56/255, 295, DIG. 9, DIG. 7, DIG. 20

[56] References Cited

U.S. PATENT DOCUMENTS

| | | | |
|---|---|---|---|
| 2,671,299 | 3/1954 | Orr | 56/255 X |
| 3,088,525 | 5/1963 | Eastham | 172/259 |
| 3,421,300 | 1/1969 | Rhodes | 56/10.8 |
| 3,686,839 | 8/1972 | Lambert | 56/11.6 |
| 3,693,333 | 9/1972 | Bishop | 56/16.1 |
| 3,693,334 | 9/1972 | Lowery | 56/16.9 |
| 3,803,818 | 4/1974 | Chaney | 56/11.6 |
| 4,292,791 | 10/1981 | Lalonde | 56/295 X |
| 4,478,028 | 10/1984 | Dawson, Jr. | 56/16.9 |
| 4,528,805 | 7/1985 | Zitta | 56/11.6 |
| 4,678,042 | 7/1987 | Barton et al. | 56/17.1 X |
| 4,840,020 | 6/1989 | Oka | 56/17.2 X |
| 4,852,658 | 8/1989 | Wessel | 172/14 |
| 4,979,573 | 12/1990 | Williamson | 172/15 |

OTHER PUBLICATIONS

Washington Evening Star, Mutt and Jeff comic strip, Aug. 24, 1952.

Primary Examiner—David J. Bagnell
Attorney, Agent, or Firm—John R. Flanagan

[57] ABSTRACT

A grass line mowing apparatus for cutting boundary lines in the grass of a playing field is provided with a carriage apparatus having a housing with a deck spaced above the ground, a vertical rotary shaft mounted for rotation relative to the housing deck and extending below the deck, and power drive source mounted on the housing deck and drivingly coupled to the rotary shaft to cause rotation thereof. The grass line mowing apparatus includes a line cutting blade assembly fastened to a mounting flange on a lower end of the rotary shaft and capable of cutting a swath of grass of narrow width to define the desired boundary line. The mowing apparatus also includes a gauge and lift assembly secured to a front end of the housing and extending forwardly thereof assist an operator in visually guiding the carriage assembly in alignment with the desired boundary line and being actuatable for adjusting the housing between a forwardly and upwardly inclined position in which the line cutting blade is raised from the grass and a horizontal position in which the line cutting blade is lowered into the grass. The mowing apparatus further includes an arc generating assembly having a flexible member being adjustable to preset its length to permit cutting of a curved boundary line having a radius as determined by the preset length of the flexible member.

21 Claims, 3 Drawing Sheets

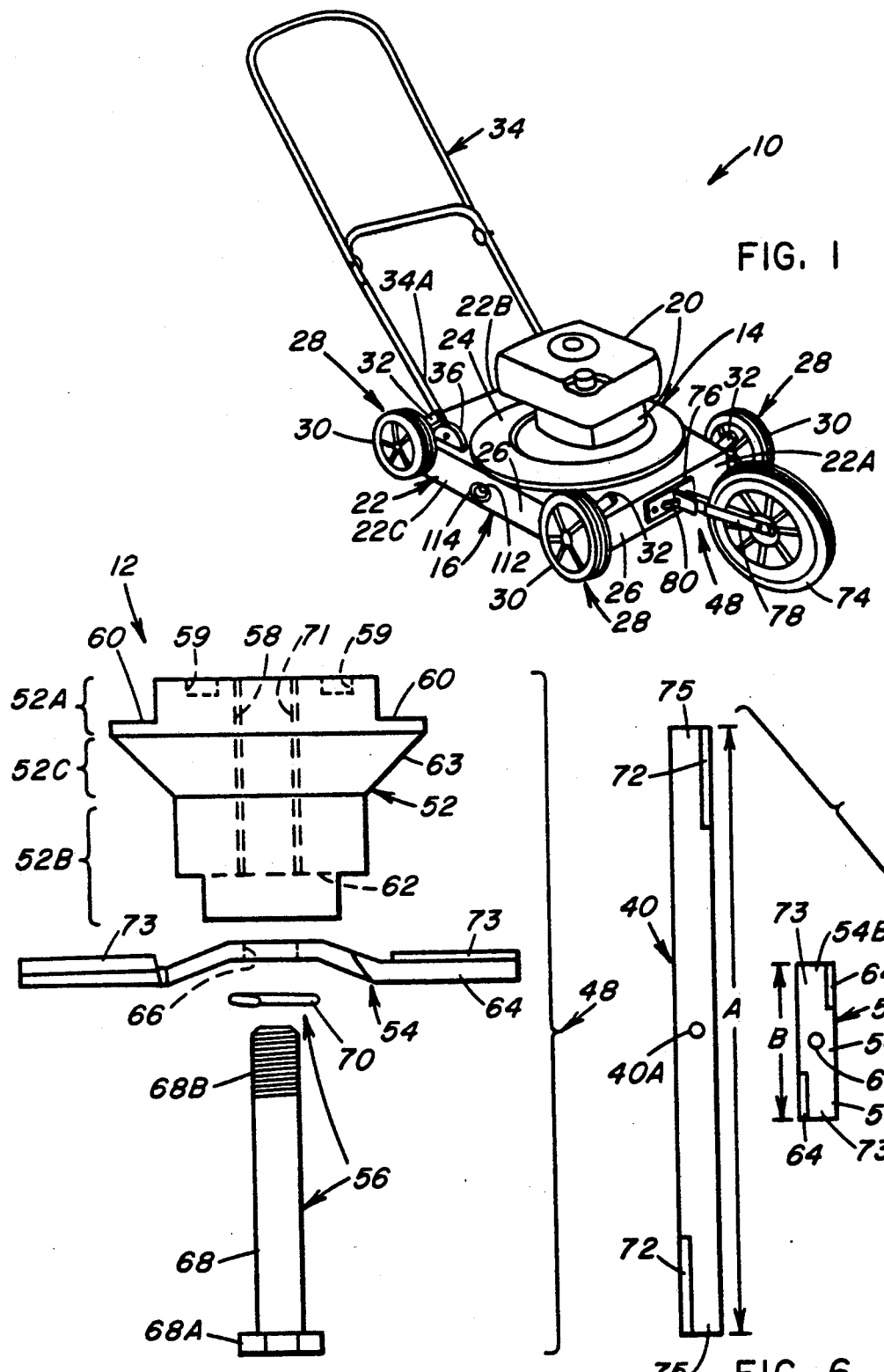

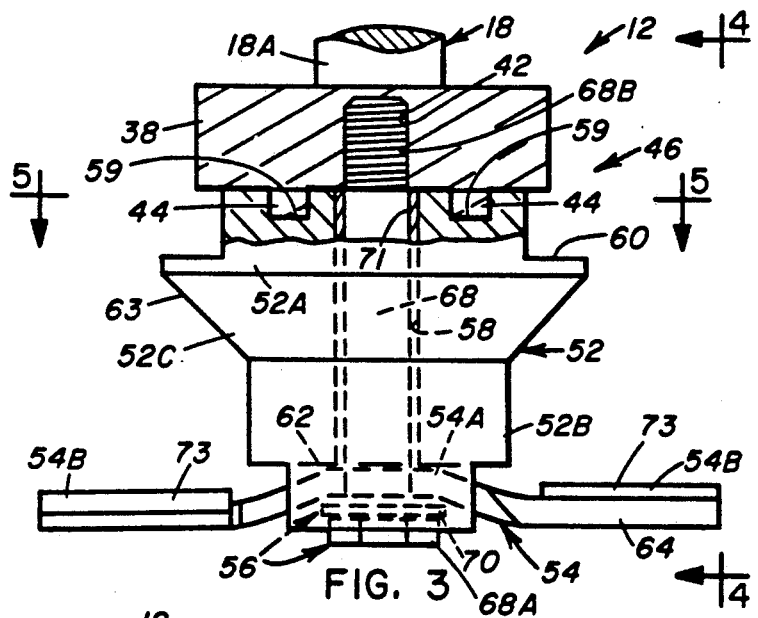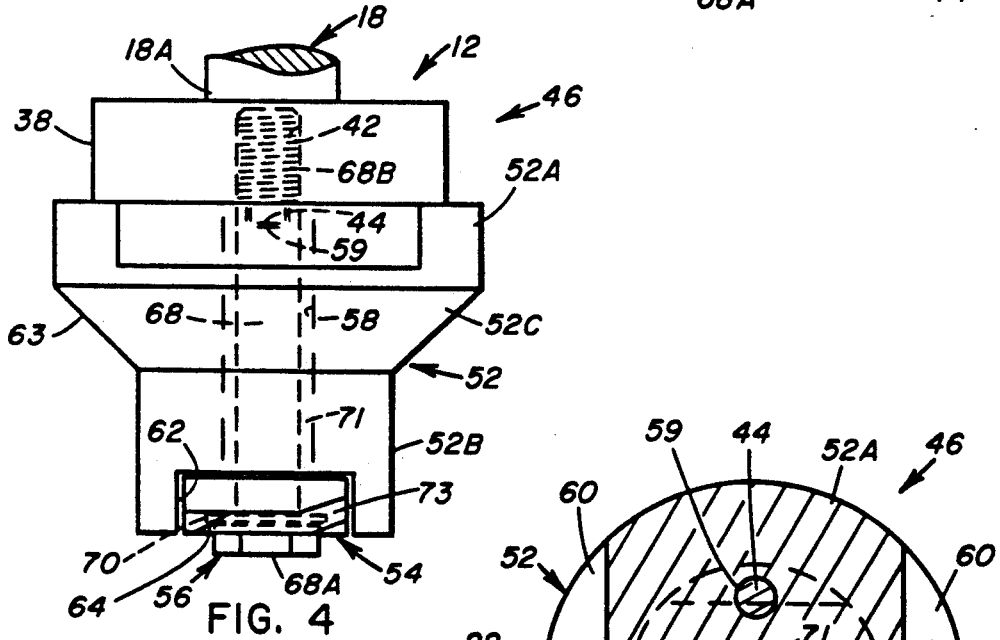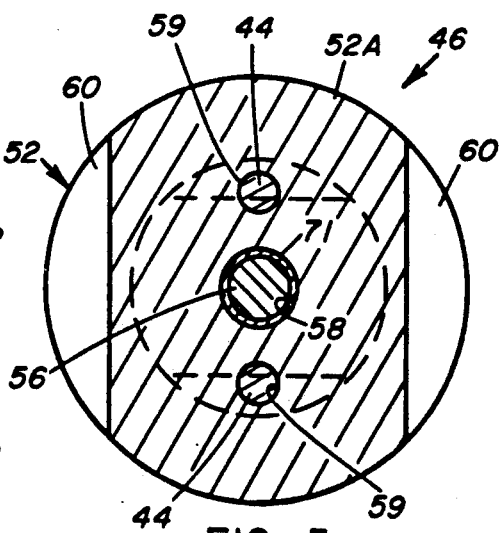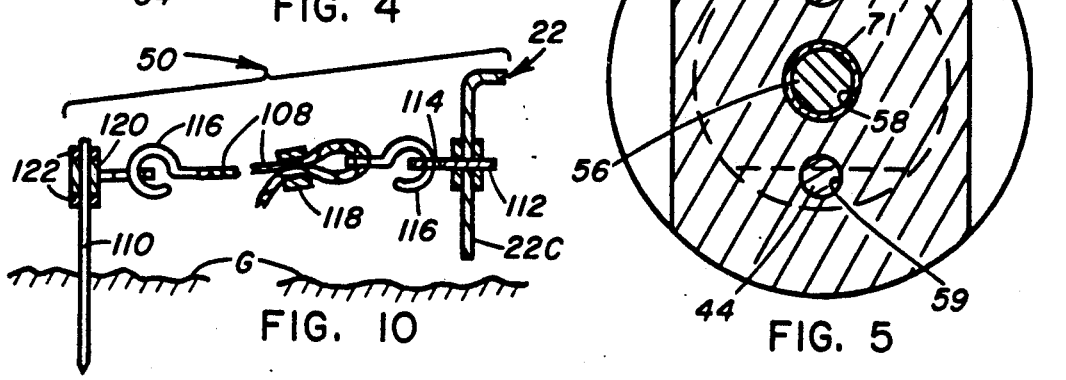

GRASS LINE MOWING APPARATUS

BACKGROUND OF THE INVENTION

1. Field of the Invention

The present invention generally relates to laying out game playing fields and, more particularly, is concerned with a grass line mowing apparatus employed to cut boundary lines in the grass of the playing field.

2. Description of the Prior Art

In team sports such as volleyball, football and soccer, visible boundary lines are necessary for the players and officials to be able to easily distinguish in-bounds from out-of-bounds areas of the playing field. The same is equally true for many other activities conducted at school and municipal playgrounds to divide play areas for safety or where starting and finishing lines are needed. For volleyball, football and soccer playing fields, the boundaries are composed of straight lines in rectangular patterns. Other playground and school activities typically utilize both straight lines and circles for playing games or to make patterns and designs on the grass.

Traditional practices for laying out boundary lines on playing fields having natural grass have been to apply a fluid chemical, for example kerosene, to kill or retard growth of the grass to make the desired line, or to apply chalk or paint to make the line on the grass.

These traditional practices have several drawbacks. One drawback is that the application of a fluid chemical, such as kerosene, that is detrimental to the survival or growth of grass is typically toxic to humans also. This fluid also increases the risk of polluting ground water. As a result, many jurisdictions have banned the use of such fluid chemicals for this purpose. Another drawback is that chalk and paint wear or wash away quite easily and so must be reapplied frequently. In light of the drawbacks of these traditional practices, it would be desirable to find an ecologically sound, economical and non-toxic way to make game boundary lines in the playing field grass.

One approach might be to employ an edger apparatus for this purpose. Different edger attachments are known in the prior patent art for trimming grass along sidwalks, driveways, street curbs and the like. Representative of these edger attachments are the apparatuses disclosed in U.S. Pat. No. 3,421,300 to Rhodes, U.S. Pat. No. 3,686,839 to Lambert, U.S. Pat. No. 3,693,333 to Bishop, U.S. Pat. No. 3,693,334 to Lowery, U.S. Pat. No. 3,803,818 to Chaney, and U.S. Pat. No. 4,478,028 to Dawson, Jr., U.S. Pat. No. 4,528,805 to Zitta, U.S. Pat. No. 4,852,658 to Wessel et al, and U.S. Pat. No. 4,979,573 to Williamson. However, none of these apparatuses is seen as a workable solution to the problem of how to satisfactorily provide the desired boundary lines for grass playing fields.

Consequently, a need exists for an alternative approach to providing playing field boundary lines in grass which avoids the limitations and drawbacks of the traditional practices.

SUMMARY OF THE INVENTION

The present invention provides a grass line mowing apparatus designed to satisfy the aforementioned needs. The grass line mowing apparatus of the present invention provides an ecologically sound, economical and non-toxic approach to making game boundary lines in the playing field grass. The grass line mowing apparatus can be employed in conjunction with a conventional rotary lawn mower or provided as a special purpose line mower to cut the boundary lines in the grass of the playing field.

Whether the grass line mowing apparatus is provided as an attachment to a conventional rotary lawn mower or incorporated as part of a dedicated mower, it will be supported by a mobile carriage apparatus. The carriage apparatus includes a mobile chassis having a housing with a deck spaced above the ground, a vertical rotary shaft mounted to the housing deck for rotation relative to the deck and extending below the deck, and power means mounted on the housing deck and drivingly coupled to the rotary shaft and being operable to cause rotation of the rotary shaft.

In accordance with one feature of the present invention, the grass line mowing apparatus includes a line cutting blade assembly fastened to a mounting flange on a lower end of the rotary shaft and capable of cutting a swath of grass of narrow width to define the desired boundary line. The blade assembly includes an adapter body, a line cutting blade, and a fastening means. The adapter body has opposite upper and lower portions, with the upper portion of the adapter body being matable with the mounting flange on the rotary shaft.

The line cutting blade has a central mounting portion matable with the lower portion of the adapter body for disposing the cutting blade at a location spaced below the mounting flange. The line cutting blade also has a pair of opposite end portions extending from opposite sides of the central mounting portion and defining a pair of cutting edges being spaced apart from one another for cutting the swath of grass of narrow width to define the desired boundary line. The fastening means is capable of removably fastening the line cutting blade to the adapter body and the adapter body to the mounting flange.

In accordance with another feature of the present invention, the grass line mowing apparatus includes a gauge and lift assembly secured to a front end of the housing of the carriage apparatus and extending forwardly thereof to assist an operator in visually guiding the carriage assembly in alignment with the desired boundary line. The gauge and lift assemby is also actuatable for adjusting the housing between a forwardly and upwardly inclined position in which the line cutting blade is raised from the grass and a horizontal position in which the line cutting blade is lowered into the grass.

More particularly, the gauge and lift assembly includes a gauge wheel, a bracket attached to the front end of the housing, and a yoke pivotally mounted at a rear end to the bracket and rotatably mounting the gauge wheel at an opposite forward end of the yoke. The gauge and lift assembly also includes means for releasably locking the yoke at its rear end to the bracket at a selected one of first and second angularly and vertically displaced positions relative to the housing for adjusting the housing between the inclined and horizontal positions.

In accordance with still another feature of the present invention, the grass line mowing apparatus incorporates an arc generating assembly. The arc generating assembly includes an elongated flexible member which can be adjusted to preset its length to permit cutting of a curved boundary line in the grass having a radius as determined by the preset length of the flexible member. The arc generating assembly also includes a stake insertable in the ground and means secured to a side of the housing for defining an eyelet. The flexible member is inelastic and attachable at its opposite ends respectively to the eyelet and stake.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a conventional rotary lawn mower equipped with the grass line mowing apparatus of the present invention.

FIG. 2 is an exploded side elevational view of a line cutting blade assembly of the line mowing apparatus of FIG. 1.

FIG. 3 is a side elevational view of the line cutting blade assembly of FIG. 2 shown assembled to a blade mounting flange on a vertical rotary shaft of the lawn mower.

FIG. 4 is an end elevational view of the assembled components of the blade assembly as seen along line 4—4 of FIG. 3.

FIG. 5 is a cross-sectional view of the assembled components of the blade assembly taken along line 5—5 of FIG. 4.

FIG. 6 is a diagrammatic view comparing the length of a line cutting blade of the blade assembly with the length of a lawn mowing blade of a conventional lawn mower.

FIG. 10 is a fragmentary side elevational view of an arc generating assembly of the line mowing apparatus of FIG. 1.

DETAILED DESCRIPTION OF THE PREFERRED EMBODIMENT

Introduction

Figure 7:
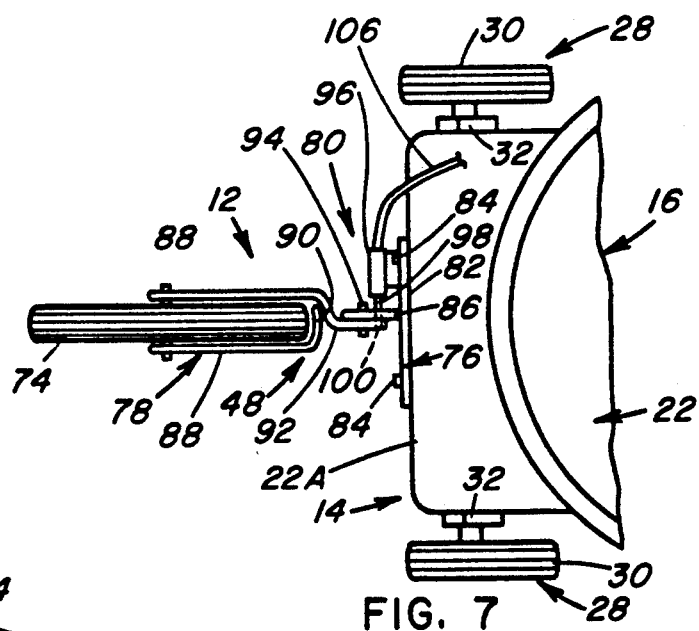
FIG. 7 is an enlarged top plan view of a gauge and lift assembly of the line mowing apparatus of FIG. 1.

Referring to the drawings, and particularly to FIG. 1, there is illustrated a conventional rotary lawn mower 10 employing a grass line mowing apparatus, generally designated 12, in accordance with the principles of the present invention, for cutting the boundary lines in the grass of the playing field. As mentioned earlier, the grass line mowing apparatus 12 can be employed as an attachment to the conventional rotary lawn mower 10 or provided as a special purpose or dedicated line mower. In both cases, a mobile carriage apparatus 14 is provided for supporting the grass line mowing apparatus 12.

Mobile Carriage Apparatus

Referring to FIG. 1, the mobile carriage apparatus 14 basically includes a mobile chassis 16, a vertical rotary shaft 18 (FIG. 3), and a power means 20. The mobile chassis 16 of the carriage apparatus 14 includes a housing 22 defined by a generally horizontal platform or deck 24 spaced above the ground and a skirt 26 attached to the deck 24. The skirt 26 extends downwardly from and around the periphery of the deck 24. The housing 22 typically is substantially rectangular in shape and has opposite front and rear ends 22A, 22B and opposite sides 22C.

Also, the mobile chassis 16 of the carriage apparatus 14 includes pairs of front and rear wheel assemblies 28 generally mounted at the corners of the housing 22 and, more specifically, to the skirt 26 at opposite sides 22C of the housing 22, respectively adjacent the front and rear ends 22A, 22B of the housing. The wheel assemblies 28 typically include wheels 30 and adjustment mechanisms 32 rotatably mounting the wheels 30 to the housing skirt 26 in a manner which allows the height of the housing 22 above the ground to be varied by actuating the adjustment mechanisms 32. The construction and operation of a suitable adjustment mechanism is well-known to those of ordinary skill in the art and thus need not be illustrated nor described in any further detail in view that such mechanism does not form any part of the present invention.

Further, the mobile chassis 16 of the carriage apparatus 14 includes a handle assembly 34 which is mounted to the rear end 22B of the housing 22 so as to extend at a rearwardly and upwardly inclined angle for allowing the mobile carriage apparatus 14 to be easily pushed over the area to be mowed. Typically, the handle assembly 34 is secured at its lower ends 34A to brackets 36 fixed on the deck 24 of the housing 22 between and adjacent to the rear wheel assemblies 28.

The vertical rotary shaft 18 (FIG. 3) of the mobile carriage apparatus 14 is mounted to the deck 24 of the housing 22 for rotation relative to the deck 22 about a vertical rotational axis. The vertical rotary shaft 18 extends below the deck 22. Typically, a suitable mounting means such as a flange 38 is rigidly fixed on the lower end 18A of the rotary shaft 18 for attaching an elongated mowing blade 40 (shown diagrammatically in FIG. 6). As seen in FIG. 3, the mounting flange 38 typically has a central threaded bore 42 and a pair of downwardly-projecting protuberances 44 fixed to the flange 38 on opposite sides of the bore 42 which mate with a pair of holes (not shown) defined in the mowing blade 40. A fastening bolt (not shown) is inserted through a central opening 40A in the mowing blade 40 and threaded into the central bore 42 for firmly securing the mowing blade 40 to the mounting flange 38. The protuberances 44 on the mounting flange 38 extending into the holes (not shown) in the mowing blade 40 assist in transmitting the torque of the vertical rotary shaft 18 to the mowing blade 40 so as to eliminates the tendency of the inertia of the mowing blade mass to cause loosening of the fastening bolt.

The power means 20 of the carriage apparatus 14 can be a gas or electric motor, such as commonly used by conventional rotary lawn mowers. The motor 20 is mounted above the housing 22 upon the deck 24. The motor 20 has an output drive shaft (not shown) which extends below the decks and substantially parallel to the rotary shaft 18. The drive shaft of the motor 20 is drivingly coupled to the vertical rotary shaft 18 by a transmission, such as a pair of sheaves (not shown) respectively mounted on the motor drive shaft and the rotary shaft 18 and an endless drive belt (not shown) extending between and entrained over the sheaves. Thus, rotation of the drive shaft of the motor 20 will cause rotation of the vertical rotary shaft 18. Suitable controls are mounted to the handle assembly 34 and connected to the motor 20 for controlling its operation and speed. The construction and operation of the drive transmission and motor controls are well-known to those of ordinary skill in the art and thus need not be illustrated nor described in any further detail in view that such components do not form any part of the present invention.

Grass Line Mowing Apparatus of the Invention

The grass line mowing apparatus 12 of the present invention basically includes a line cutting blade assembly 46, a gauge and lift assembly 48, and an arc generating assembly 50. Referring to FIGS. 2-5, the line cutting blade assembly 46 of the mowing apparatus 12 is shown fastened to the mounting flange 38 on the lower end 18A of the vertical rotary shaft 18 in replacement of the mowing blade 40. The line cutting blade assembly 46 is capable of cutting a swath of grass of desired narrow width to define the desired boundary line.

More particularly, the line cutting blade assembly 46 includes an adapter body 52, a line cutting blade 54, and means 56 for removably fastening the blade 54 and the adapter body 52 to the mounting flange 38. The adapter body 52 of the blade assembly 46 has opposite upper and lower portions 52A, 52B and a middle portion 52C disposed between the upper and lower portions. Also, the adapter body 52 has a bore 58 extending axially through the upper, lower and middle portions 52A, 52B, 52C thereof.

The upper portion 52A of the adapter body 52 is matable with the mounting flange 38 on the vertical rotary shaft 18. The adapter body upper portion 52A has a pair of recesses 59 defined therein adjacent opposite sides of the axial bore 58 through the adapter body 52. The recesses 59 mate with the protuberances 44 on the mounting flange 38 when the adapter body 52 and line cutting blade 54 are secured to the mounting flange 38. Also, a pair of recessed ledges 60 are defined along opposite sides of the upper portion 52B so as to adapt the upper portion 52A to be receivable within a variety of different widths of mounting flanges 38 of inverted U-shaped cross-sectional configurations on various conventional lawn mowers.

A channel 62 is defined in the lower portion 52B of the adapter body 52 which extends in transverse relation to and intersects with the bore 58. The middle portion 52C of the adapter body 52 has an exterior inverted frustoconical shape defining an annular surface 63 which extends outwardly and upwardly from the lower portion 52B of the adapter body 52. Thus, the diameter of the upper portion 52A of the adapter body 52 above the annular surface 63 is larger than the diameter of the lower portion 52B thereof below the annular surface 63.

The line cutting blade 54 of the blade assembly 46 has a central mounting portion 54A and a pair of opposite end portions 54B extending from opposite sides of the central mounting portion 54A and defining a pair of cutting edges 64. The central mounting portion 54A of the line cutting blade 54 is matable with the lower portion 52B of the adapter body 52 by being receivable through channel 62 thereof. When the central mounting portion 54A is disposed in the adapter body channel 62, the opposite end portions 54B of the line cutting blade 54 extend laterally from the lower portion 52B of the adapter body 52. The inverted frusto-conical shaped annular surface 63 of the middle portion 52C of the adapter body 52 at least partially overlies the opposite end portions 54B of the line cutting blade 54 which tends to deflect the flow of grass cut by the cutting blade 54 in an radially outward direction so as to promote dispersing of the severed grass away from the boundary line being cut in the grass playing field.

The line cutting blade 54 also has a hole 66 defined through its central mounting portion 54A which is aligned with the axial bore 58 of the adapter body 52 when the line cutting blade 54 is properly disposed in the channel 62 of the lower portion 52B of the adapter body 52. The fastening means 56 takes the form of an elongated bolt 68 and a lock washer 70. The bolt 68 has a head 68A at one end and is threaded at an opposite end 68B. For securing the adapter body 52 to the mounting flange 38 and the line cutting blade 54 to the adapter body 52, the bolt 68 is inserted through the central hole 66 of the line cutting blade 54 and the axial bore 58 of the adapter body 52 and threaded into the central threaded opening 42 of the mounting flange 38. The lock washer 70 disposed between the line cutting blade 54 and the head 68A of the bolt 68 imposes a load which prevents loosening of the bolt 68 due to vibration. The sides of the channel 62 which prevent rotation of the cutting blade 54 relative to the adapter body 52 thereby prevent the inertia of the mass of the cutting blade 54 from causing the bolt to loosen. The axial bore 58 can have an over-sized diameter and receive an adapter sleeve 71 of a preselected diameter size in order to adapt the adapter body 52 to fit the diameter of a different size of the bolt 68 used in different mowers.

Figure 8:
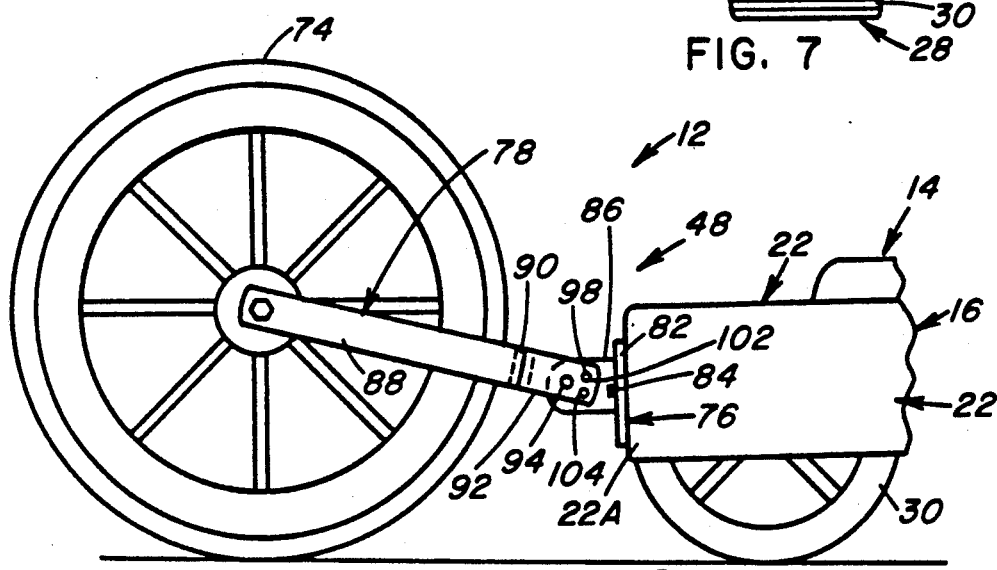
FIG. 8 is a side elevational view of the gauge and lift assembly taken along line 8—8 of FIG. 7 and shown in a lowered position.
Figure 9:
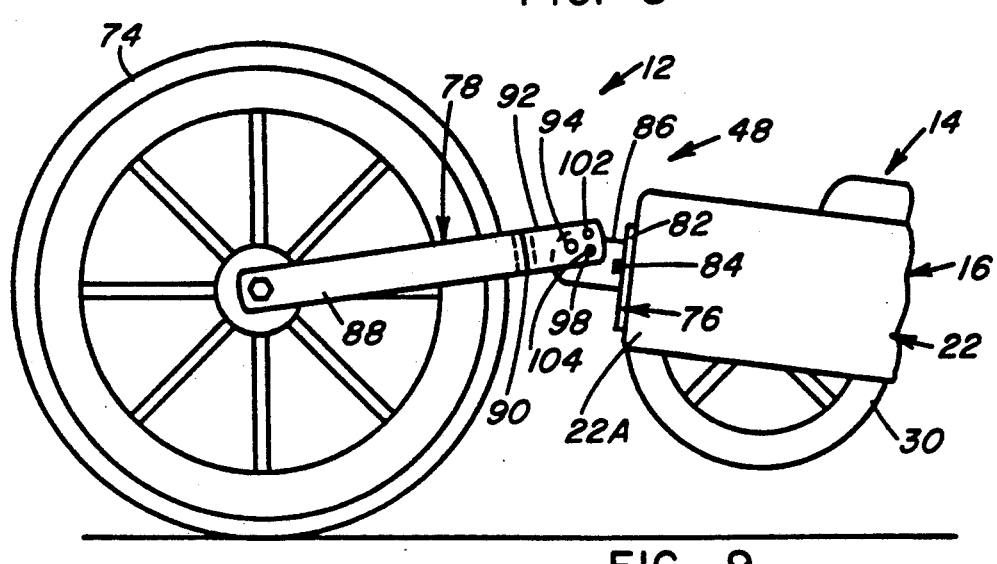
FIG. 9 is a side elevational view similar to that of FIG. 8 but showing the gauge and lift assembly in a raised position.

Referring to FIG. 6, there is diagrammatically illustrated a comparison of the conventional lawn mowing blade 40 with the line cutting blade 54 of the blade assembly 46. The lawn mowing blade 40 has opposite end portions containing cutting edges 72 being spaced apart a substantially greater distance than the cutting edges 64 of the line cutting blade 54 so as to define a cutting zone A being of much greater width than the width the cutting zone B defined by the cutting edges 64 of the line cutting blade 54. Thus, the line cutting blade 54 is capable of cutting a swath of grass having a desired width substantially less than the width of a swath cut by the lawn mowing blade 40. Also, it will be readily observed that the presence of the adapter body 52 serves to dispose the line cutting blade 54 at a location being spaced below the location of the conventional lawn mowing blade 40 relative to the mounting flange 38. Both the line cutting blade 54 and lawn mower blade 40 have upwardly inclined portions 73, 75 rearwardly of the cutting edges 64, 72 for creating drafts to lift the grass for the next cutting edge Referring to FIGS. 7-9, the gauge and lift assembly 48 of the mowing apparatus 12 is shown secured to the front end 22A of the housing 22 of the carriage apparatus 14. The gauge and lift assembly 40 extends forwardly from the carriage apparatus 14 to assist an operator in visually guiding the carriage assembly 14 in alignment with the desired boundary line. The gauge and lift assemby 46 is also actuatable for adjusting the housing 22 between a substantially horizontal position, as seen in FIG. 8, in which the line cutting blade 54 is lowered into the grass and forwardly and upwardly inclined position, as seen in FIG. 9, in which the line cutting blade 54 is raised from the grass.

More particularly, the gauge and lift assembly 48 includes a gauge wheel 74, a bracket 76, an elongated yoke 78, and a releasable locking means 80. The bracket 76 of the assembly 48 includes a plate 82 removably attached by screws 84 to the front end 22A of the housing 22, and a mounting tab 86 rigidly attached to the middle of the plate 82 and extending forwardly therefrom. The elongated yoke 78 of the assembly 48 at its rear end is pivotally mounted to the bracket 76 and at its forward end rotatably mounts the gauge wheel 74.

More particularly, the elongated yoke 78 has a bifurcated configuration formed by a pair of generally parallel legs 88 which at their forward ends rotatably mount the gauge wheel 74 between them and at their rear ends are bent at right angles and rigidly attached to one another to define a bight portion 90 of the yoke 78. The yoke 78 also has an extension 92 affixed to the bight portion 90 and projecting rearwardly thereof. A fastener 94 couples the yoke extension 92 to the bracket tab 86 so as to pivotally mount the yoke 78 to the bracket 76.

The locking means 80 of the assembly 48 includes a cylinder 96 attached to the bracket plate 82 adjacent the bracket tab 86 and a plunger latch pin 98 mounted within and projecting from the cylinder 96. The latch pin 98 is spring biased for releasably locking the yoke 78 at its rear extension 92 to the bracket tab 86. The locking means 80 also includes a single aperture 100 defined through the bracket tab 86 at a location radially outwardly from the fastener 94 and a pair of angularly spaced holes 102, 104 defined through the yoke extension 92. The holes 102, 104 in the yoke extension 92 will be aligned with the aperture 100 in the bracket tab 86 when the yoke 78 and the gauge wheel 74 therewith are correspondingly disposed at respective first and second angularly and vertically displaced positions shown in FIGS. 8 and 9.

Upon pivoting of the yoke 78 relative to the bracket 76 and housing 22 to one of the first and second angularly and vertically displaced positions which brings a respective one of the holes 102, 104 in the yoke extension 92 into aligned with the aperture 100 in the bracket tab 86, the plunger latch pin 98 due to its spring bias mounting in the cylinder 96 will automatically reciprocally move toward the yoke 78 and its end 98A will extend through the aperture 100 and respective one of the holes 102, 104 aligned with the aperture. The locking means 80 of the assembly 48 also includes a cable 106 attached at one end to the plunger latch pin 98 and mounted at the other end (not shown) to the handle assembly 34 so that it can be conveniently pulled by the operator to reciprocate the plunger latch pin 98 in a direction away from the yoke 78 and release it from engagement with the bracket tab 86 and yoke extension 92 to permit adjustment of the yoke 78 between the first and second positions.

Referring to FIG. 10, the arc generating assembly 50 of the mowing apparatus 12 is shown setup for permitting the mobile carriage apparatus 14 to be along a circular path. The arc generating assembly 50 includes a flexible member 108 being adjustable to preset its length to permit cutting of a curved boundary line in the grass having a radius as determined by the preset length of the flexible member 108. The arc generating assembly also includes a stake 110 insertable into the ground G, and means in the form of a bolt 112 secured to a side 22C of the housing 22 and defining an eyelet 114. The flexible member 108 is inelastic and attachable at opposite ends respectively to the eyelet 114 and stake 110. As an example, the flexible member 108 can be a rope or cord having hook elements 116 at its opposite ends, and a band 118 which is releasable for adjusting the effective length of the flexible member. The stake 110 has a ring 120 rotatably mounted to its upper end between a pair of nuts 122. The ring 120 permits the flexible member 108 to swing 360° about the stake 110.

In conclusion, by coordinated use of the line cutting blade assembly 46, the gauge and lift assembly 48 and the arc generating assembly 50 of the grass line mowing apparatus 12, the apparatus 12 can be effectively employed to make semi-permanent boundaries in the grass of playing fields in the form of straight lines, arcs and complete circles. The swath of grass that is cut will be narrow in width, for example four inches. The swath of grass also is cut deep enough so that it will kill or shock the remaining grass stubble so as to impede its growth in order that the boundary lines will not be obliterated by normal field mowing operations.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A line cutting blade assembly in combination with a mounting flange of a vertical rotary shaft on a rotary lawn mower, said line cutting blade assembly being a replacement for an elongated lawn mowing blade having a central portion attachable directly to said mounting flange for disposing said lawn mowing blade at a first location relative to said mounting flange, said mowing blade also having a pair of opposite end portion extending from opposite sides of said central portion and defining a pair of cutting edges being spaced apart from one another through a first distance such that said lawn mowing blade is capable of cutting a swath of grass of a first width, said line cutting blade assembly comprising:

(a) an adapter body having opposite upper and lower portions, said upper portion of said adapter body being matable with said mounting flange;

(b) a line cutting blade having a central mounting portion matable with said lower portion of said adapter body for disposing said cutting blade at a second location being spaced below said first location of said lawn mowing blade relative to said mounting flange, said line cutting blade also having a pair of opposite end portions extending from opposite sides of said central mounting portion and defining a pair of cutting edges being spaced apart from one another through a second distance being substantially less than said first distance of said cutting edges of said lawn mowing blade such that said cutting blade is capable of cutting a swath of grass of a second width substantially less than said first width of the swath of grass cut by said lawn mowing blade; and (c) means for removably fastening said cutting blade to said adapter body and said adapter body to said mounting flange.

2. The blade assembly of claim 1 wherein: said mounting flange has a threaded opening defined therein;

said adapter body has an bore extending axially therethrough between said upper and lower portions thereof;

said line cutting blade having a hole through said central mounting portion thereof; and said fastening means is an elongated member being threaded at one end portion, said fastening member being insertable through said hole of said line cutting blade and said bore of said adapter body and threadable into said threaded opening of said mounting flange for securing said adapter body and line cutting blade to said mounting flange.

3. The blade assembly of claim 2 wherein said adapter body has a channel defined in said lower portion extending in transverse relation to said bore for receiving said central mounting portion of said line cutting blade such that opposite end portions of said cutting blade extend laterally from said lower portion of said adapter body.

4. The blade assembly of claim 2 wherein said adapter body has a middle portion disposed between said upper and lower portions thereof, said middle portion having an inverted frustoconical shape defining an annular surface which extends outwardly and upwardly and at least partially overlies said opposite end portions of said cutting blade.

5. The blade assembly of claim 1 wherein:
   said mounting flange has a pair of protuberances fixed thereon adjacent opposite sides of said threaded opening and projecting downwardly therefrom; and
   said adapter body has a pair of recesses defined in said upper portion thereof adjacent opposite sides of said bore, said recesses being matable with said protuberances on said mounting flange when said adapter body and line cutting blade are secured to said mounting flange.

6. In combination with a carriage apparatus including a mobile chassis having a housing with a top deck spaced above the ground, a vertical rotary shaft mounted to said housing deck for rotation relative to said housing and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:
   (a) a line cutting blade assembly including
      (i) a line cutting blade capable of cutting a swath of grass of a desired width for defining a desired boundary line of a game playing field, said line cutting blade having a central mounting portion and a pair of opposite end portions extending from opposite sides of said central mounting portion and defining a pair of cutting edges being spaced apart from one another for cutting the swath of grass of desired width to define the desired boundary line, and
      (ii) an adapter body having opposite upper and lower portions and a middle portion disposed between said upper and lower portions, said upper portion being matable with said mounting means on said lower end portion of said rotary shaft, said lower portion being matable with said central mounting portion of said line cutting blade for disposing said cutting blade spaced below said rotary shaft mounting means, said middle portion having an inverted frustoconical shape defining an annular surface which extends outwardly and upwardly and at least partially overlies said opposite end portions of said cutting blade;
   (b) means for removably fastening said line cutting blade assembly to said mounting means of said rotary shaft; and
   (c) gauge means mounted to a front end of said housing and extending forwardly therefrom for assisting an operator in visually guiding said carriage apparatus in alignment with the desired boundary line.

7. The blade assembly of claim 6 wherein said adapter body has a channel defined in said lower portion extending in transverse relation to said bore for receiving said central mounting portion of said line cutting blade such that opposite end portions of said cutting blade extend laterally from said lower portion of said adapter body.

8. The mowing apparatus of claim 6 wherein:
   said mounting means has a threaded opening defined therein;
   said adapter body has an bore extending axially therethrough between said upper and lower portions thereof;
   said line cutting blade has a hole defined through said central mounting portion thereof; and
   said fastening means is an elongated member threaded at one end portion, said fastening member being insertable through said hole of said line cutting blade and said bore of said adapter body and threadable into said threaded opening of said mounting flange for securing said adapter body and line cutting blade to said mounting means.

9. In combination with a carriage apparatus including a mobile chassis having a housing with a top deck spaced above the ground, a vertical rotary shaft mounted to said housing deck for rotation relative to said deck and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:
   (a) a line cutting blade assembly including
      (i) a line cutting blade capable of cutting a swath of grass of a desired width for defining a desired boundary line of a game playing field, said line cutting blade having a central mounting portion and a pair of opposite end portions extending from opposite sides of said central mounting portion and defining a pair of cutting edges being spaced apart from one another for cutting the swath of grass of desired width to define the desired boundary line, and
      (ii) an adapter body having opposite upper and lower portions and a middle portion disposed between said upper and lower portions, said upper portion being matable with said mounting means on said lower end portion of said rotary shaft, said lower portion being matable with said central mounting portion of said line cutting blade for disposing said cutting blade spaced below said rotary shaft mounting means, said middle portion having an inverted frustoconical shape defining an annular surface which extends outwardly and upwardly and at least partially overlies said opposite end portions of said cutting blade;

(b) means for removably fastening said line cutting blade assembly to said mounting means of said rotary shaft; and (c) lift means mounted to a front end of said housing and extending forwardly therefrom and being actuatable between first and second angularly and vertically displaced positions relative to said housing for adjusting said housing between a forwardly and upwardly inclined position in which said line cutting blade is raised from the grass and a horizontal position in which said line cutting blade is lowered into the grass.

10. The blade assembly of claim 9 wherein said adapter body has a channel defined in said lower portion extending in transverse relation to said bore for receiving said central mounting portion of said line cutting blade such that opposite end portions of said cutting blade extend laterally from said lower portion of said adapter body.

11. The mowing apparatus of claim 9 wherein:
said mounting means has a threaded opening defined therein;
said adapter body has an bore extending axially therethrough between said upper and lower portions thereof;
said line cutting blade has a hole defined through said central mounting portion thereof; and
said fastening means is an elongated member threaded at one end portion, said fastening member being insertable through said hole of said line cutting blade and said bore of said adapter body and threadable into said threaded opening of said mounting flange for securing said adapter body and line cutting blade to said mounting means.

12. In combination with a carriage apparatus including a mobile chassis having a housing with a deck spaced above the ground, a vertical rotary shaft mounted to said housing deck for rotation relative to said deck and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:

(a) a line cutting blade assembly including a line cutting blade capable of cutting a swath of grass of a desired width for defining a desired boundary line of a game playing field and means for mounting said line cutting blade to said mounting means of said rotary shaft; and (b) gauge and lift means mounted to a front end of said housing and extending forwardly therefrom for assisting an operator in visually guiding said carriage apparatus in alignment with the desired boundary line and also being actuatable for adjusting said housing between a forwardly and upwardly inclined position in which said line cutting blade is raised from the grass and a horizontal position in which said line cutting blade is lowered into the grass, said gauge and lift means including (i) a gauge wheel, (ii) a bracket attached to a front end of said housing, (iii) a yoke pivotally mounted at a rear end to said bracket and extending forwardly therefrom, said yoke at an opposite forward end rotatably mounting said gauge wheel, and (iv) means for releasably locking said yoke at said rear end to said bracket at a selected one of first and second angularly and vertically displaced positions for adjusting said housing between said inclined and horizontal positions.

13. The mowing apparatus of claim 12 wherein:
said line cutting blade assembly also includes an adapter body having opposite upper and lower portions, said upper portion of said adapter body being matable with said mounting means on said lower end portion of said rotary shaft;
said line cutting blade has a central mounting portion matable with said lower portion of said adapter body for disposing said cutting blade spaced below said rotary shaft mounting means, said line cutting blade also having a pair of opposite end portions extending from opposite sides of said central mounting portion and defining a pair of cutting edges being spaced apart from one another for cutting the swath of grass of desired width to define the desired boundary line.

14. The mowing apparatus of claim 13 wherein:
said mounting means has a threaded opening defined therein;
said adapter body has an bore extending axially therethrough between said upper and lower portions thereof;
said line cutting blade has a hole defined through said central mounting portion thereof; and
said fastening means is an elongated member threaded at one end portion, said fastening member being insertable through said hole of said line cutting blade and said bore of said adapter body and threadable into said threaded opening of said mounting flange for securing said adapter body and line cutting blade to said mounting means.

15. The mowing apparatus of claim 12 wherein said means for releasably locking includes:
means for defining a single aperture through said bracket;
means for defining a pair of angularly spaced holes through said rear end of said yoke, said holes in said yoke rear end being aligned with said aperture in said bracket when said yoke is correspondingly disposed at said respective first and second angularly displaced positions; and
means mounted to said bracket for undergoing reciprocal movement relative to said bracket and rear end of said yoke such that said reciprocal means is extendable through said aperture and a respective one of said holes aligned with said aperture upon pivoting of said yoke to a corresponding one of said first and second angularly and vertically displaced positions.

16. In combination with a carriage apparatus including a mobile chassis having a housing with a deck spaced above the ground, a vertical rotary shaft mounted to said housing deck for rotation relative to said deck and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:

(a) a line cutting blade assembly including a line cutting blade capable of cutting a swath of grass of a desired width for defining a desired boundary line of a game playing field and means for mounting said line cutting blade to said mounting means of said rotary shaft; and (b) an arc generating assembly including a flexible member being adjustable to preset its length to permit cutting of a curved boundary line in the grass having a constant radius as determined by the preset length of the flexible member, means for defining an eyelet being secured to a side of said houing of said mobile chassis of said carriage apparatus, a stake insertable into the ground, and means rotatably mounted on said stake for defining an attaching element, said flexible member being inelastic and attachable at opposite ends respectively to said eyelet and said rotatable attaching element on said stake such that said attaching element rotates about said stake as said mobile chassis and said flexible member therewith are moved about said stake to cut the curved boundary line having said constant radius.

17. The mowing apparatus of claim 16 wherein:
said line cutting blade assembly also includes an adapter body having opposite upper and lower portions, said upper portion of said adapter body being matable with said mounting means on said lower end portion of said rotary shaft;
said line cutting blade has a central mounting portion matable with said lower portion of said adapter body for disposing said cutting blade spaced below said rotary shaft mounting means, said line cutting blade also having a pair of opposite end portions extending from opposite sides of said central mounting portion and defining a pair of cutting edges being spaced apart from one another for cutting the swath of grass of desired width to define the desired boundary line.

18. The mowing apparatus of claim 17 wherein: said mounting means has a threaded opening defined therein;
said adapter body has an bore extending axially therethrough between said upper and lower portions thereof;
said line cutting blade has a hole defined through said central mounting portion thereof; and
said fastening means is an elongated member threaded at one end portion, said fastening member being insertable through said hole of said line cutting blade and said bore of said adapter body and threadable into said threaded opening of said mounting flange for securing said adapter body and line cutting blade to said mounting means.

19. In combination with a carriage apparatus including a mobile chassis having a housing with a top deck spaced above the ground, a vertical rotary shaft mounted to said housing deck for rotation relative to said housing and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:

(a) a line cutting blade assembly including a line cutting blade capable of cutting a swath of grass of a desired width for defining a desired boundary line of a game playing field and means for removably fastening said line cutting blade assembly to said mounting means of said rotary shaft; and (b) gauge means mounted to a front end of said housing and extending forwardly therefrom for assisting an operator in visually guiding said carriage apparatus in alignment with the desired boundary line, said gauge means including a gauge wheel, a bracket attached to a front end of said carriage apparatus, and a yoke pivotally mounted at a rear end to said bracket and extending forwardly therefrom, said yoke at an opposite forward end rotatably mounting said gauge wheel.

20. In combination with a carriage apparatus including a mobile chassis having a housing with a top deck spaced above the ground, a vertical rotary shaft mounted to said housing deck for rotation relative to said deck and extending below said deck, said rotary shaft having mounting means on a lower end portion thereof, and power means mounted on said housing deck and drivingly coupled to said rotary shaft and being operable to cause rotation of said rotary shaft, a grass line mowing apparatus, comprising:

(a) a line cutting blade assembly including a line cutting blade capable of cutting a swath of grass of a desired width for defining a desired boundary line of a game playing field and means for fastening said line cutting blade to said mounting means of said rotary shaft; and (b) lift means mounted to a front end of said housing and extending forwardly therefrom and being actuatable between first and second angularly and vertically displaced positions relative to said housing for adjusting said housing between a forwardly and upwardly inclined position in which said line cutting blade is raised from the grass and a horizontal position in which said line cutting blade is lowered into the grass, said lift means including
  (i) a gauge wheel,
  (ii) a bracket attachable to a front end of said carriage apparatus,
  (iii) a yoke pivotally mounted at a rear end to said bracket and extending forwardly therefrom, said yoke at an opposite forward end rotatably mounting said gauge wheel, and
  (iv) means for releasably locking said yoke at said rear end to said bracket at a selected one of first and second angularly and vertically displaced positions for adjusting said housing between said inclined and horizontal positions.

21. The mowing apparatus of claim 20 wherein said means for releasably locking includes;
means for defining a single aperture through said bracket;
means for defining a pair of angularly spaced holes through said rear end of said yoke, said holes in said yoke rear end being aligned with said aperture in said bracket when said yoke is correspondingly disposed at said respective first and second angularly and vertically disposed positions; and
means mounted to said bracket for undergoing reciprocal movement relative to said bracket and rear end of said yoke such that said reciprocal means is extendable through said aperture and a respective one of said holes aligned with said aperture upon pivoting of said yoke to a corresponding one of said first and second angularly and vertically displaced positions.

* * * * *